(12) United States Patent
Kishioka et al.

(10) Patent No.: US 11,782,021 B2
(45) Date of Patent: Oct. 10, 2023

(54) ELECTROLYTE CONCENTRATION MEASUREMENT DEVICE

(71) Applicant: HITACHI HIGH-TECH CORPORATION, Tokyo (JP)

(72) Inventors: Atsushi Kishioka, Tokyo (JP); Tetsuyoshi Ono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 339 days.

(21) Appl. No.: 17/265,698

(22) PCT Filed: Sep. 2, 2019

(86) PCT No.: PCT/JP2019/034355
§ 371 (c)(1),
(2) Date: Feb. 3, 2021

(87) PCT Pub. No.: WO2020/054473
PCT Pub. Date: Mar. 19, 2020

(65) Prior Publication Data
US 2021/0318266 A1 Oct. 14, 2021

(30) Foreign Application Priority Data

Sep. 13, 2018 (JP) ................................. 2018-171277

(51) Int. Cl.
*G01N 27/416* (2006.01)
*G01N 27/333* (2006.01)
*G01N 27/30* (2006.01)

(52) U.S. Cl.
CPC ....... *G01N 27/4166* (2013.01); *G01N 27/301* (2013.01); *G01N 27/333* (2013.01)

(58) Field of Classification Search
CPC .......... G01N 27/4163; G01N 27/4165; G01N 27/4166; G01N 27/301; G01N 27/333
See application file for complete search history.

(56) References Cited

U.S. PATENT DOCUMENTS

| 4,189,367 A | 2/1980 | Connery et al. |
| 4,468,608 A | 8/1984 | Rolfe |

(Continued)

FOREIGN PATENT DOCUMENTS

| JP | 58-068656 A | 4/1983 |
| JP | 06-043133 A | 2/1994 |

(Continued)

OTHER PUBLICATIONS

Extended European Search Report dated Apr. 19, 2022 for European Patent Application No. 19860479.5.

*Primary Examiner* — Alexander S Noguerola
(74) *Attorney, Agent, or Firm* — Volpe Koenig (57) ABSTRACT

An electrolyte concentration measurement device includes: an ion-selective electrode supplied with the liquid; a reference electrode serving as a reference for a potential; a potential measuring unit configured to acquire a potential of the ion-selective electrode; a concentration calculation unit configured to calculate a concentration of ions contained in the liquid based on the potential acquired by the potential measuring unit; a potential monitoring unit configured to monitor a potential of the ion-selective electrode and generate a potential response curve; a timing signal acquisition unit configured to acquire a timing signal related to a timing of various operations; and a potential response curve analysis unit configured to detect an abnormality sign of a device based on a relationship between the potential response curve and the timing signal.

8 Claims, 8 Drawing Sheets

(56) References Cited

U.S. PATENT DOCUMENTS

| | | | |
|---|---|---|---|
| 4,777,444 A * | 10/1988 | Beijk | G01N 27/4165 |
| | | | 324/438 |
| 2010/0219074 A1 | 9/2010 | Ishibe | |
| 2012/0261260 A1 | 10/2012 | Li et al. | |
| 2016/0341692 A1 | 11/2016 | Tonomura | |

FOREIGN PATENT DOCUMENTS

| JP | 2004-219352 A | 8/2004 |
|---|---|---|
| JP | 2009-121817 A | 6/2009 |
| JP | 2012-042359 A | 3/2012 |

* cited by examiner

FIG. 1

FIG. 2A
WHEN DEVICE IS STARTED UP

FIG. 2B
DURING CONTINUOUS ANALYSIS

ELECTROLYTE CONCENTRATION MEASUREMENT DEVICE

TECHNICAL FIELD

The present invention relates to an electrolyte concentration measurement device that measures an electrolyte concentration in a liquid.

BACKGROUND ART

An automatic analysis device is known as a device that analyzes a sample containing a protein contained in a specimen such as blood or urine with high accuracy and high throughput. An electrolyte concentration measurement device is often mounted on such an automatic analysis device, and may be a hybrid measurement device with blood gas and the like or a single unit of an electrolyte concentration measurement device. The electrolyte concentration measurement device is configured to analyze, for example, an electrolyte component such as a sodium (Na) ion, a potassium (K) ion, and a chlorine (Cl) ion in a sample.

Many of such electrolyte concentration measurement devices utilize a method called an ion-selective electrode method (ISE method). The ISE method measures an electrolyte concentration in a specimen by measuring a potential difference between an ion-selective electrode (ISE electrode) and a reference electrode that generates a reference potential. The ion-selective electrode includes an ion-sensitive membrane that generates a potential difference in response to an ionic component. Generally, these electrodes are consumables, and are replaced with new electrodes after reaching an end of their useful life within, for example, two or three month or thousands of tests.

In the electrolyte concentration measurement device, several kinds of reagents are constantly used. A type of the reagent to be used varies depending on a device configuration, and includes, for example, an internal standard solution, a dilute solution for diluting a specimen, and a reference electrode solution supplied to a reference electrode to form a liquid junction with a specimen solution.

In the electrolyte concentration measurement device, when a device is started up, when an electrode is replaced, or when a reagent bottle is replaced, calibration is performed with a standard solution having a known concentration and a calibration curve is created. In this way, analysis accuracy is guaranteed by periodically performing the calibration.

On the other hand, as a method for determining a sign of an abnormality of an electrode or a device, generally, there is known a method of determining a sign of an abnormality based on a result of calibration performed when a device is started up or when an electrode and a reagent bottle are replaced. For example, PTL 1 discloses a technique in which an information table is provided to manage an electrode from manufacture to lifetime, the information table storing a type of an ion to be measured, an expiration date after manufacturing of the electrode, the number of days used by a current user of the electrode, the number of electrode measurement specimens, electrode sensitivity (latest sensitivity measurement result), electrode accuracy (latest accuracy measurement result), electrode probability (latest probability measurement result), and an electrode potential (latest potential measurement result), and a prediction of a performance life (replacement time) of the electrode is calculated based on each information stored in the information table, and a calculation equation and a determination reference set in advance by a manufacturer or a user.

As a technique for determining whether a measurement value is normal, which is different from a sign of an abnormality of an electrode or a device, PTL 2 discloses a technique for determining that analysis data of a sample after suction is abnormal when potential data from suction of a sample solution to stabilization of a potential deviates from an allowable range calculated based on a value of a potential difference of the sample solution before and after suction.

CITATION LIST

Patent Literature

PTL 1: JP-A-2004-219352
PTL 2: JP-A-2012-42359

SUMMARY OF INVENTION

Technical Problem

In an electrolyte concentration measurement device, it is necessary to always operate the device stably, that is, to increase an operating rate of the device so as to achieve continuous operation for 24 hours and improvement of analysis throughput. In order to achieve the object, it is important to optimize a frequency of calibration and a frequency of maintenance.

In an electrolyte concentration measurement device of the related art, calibration is performed at a relatively high frequency such as once every several hours so as to maintain high measurement accuracy. Since increase in the frequency of calibration hinders the improvement of the operating rate of the device, it is required to increase an interval of the calibration (to decrease the frequency). In this case, it is important to constantly monitor whether there is a large change in a state of the electrode or the device between the calibrations.

Ina device of the related art, a timing of replacement of various components or an electrode is determined based on a set period and the number of analysis specimens. In addition, a slope of a calibration curve, an electromotive force, a change in measurement reproducibility, and the like are also used as a determination material in determining the replacement timing. In this way, when a device abnormality is found at the time of calibration, it is necessary to stop the device, specify a cause of the abnormality, prepare a replacement component, perform a replacement operation, and perform the calibration again. During this time, an operator is also restrained for a long time, resulting in downtime of the device and a substantial decrease in throughput.

If a sign of such an abnormality can be grasped in advance, it is possible to make a maintenance plan while operating the device without stopping the device. However, performance degradation due to contamination of a sensitive membrane surface of an ion-selective electrode, membrane peeling, or the like, slow leakage of an electromagnetic valve, and the like do not appear as a clear abnormality in a measurement potential of the ion-selective electrode. Therefore, it is difficult to accurately detect the sign of these abnormalities.

An object of the invention is to provide an electrolyte concentration measurement device capable of accurately detecting various kinds of abnormality signs of a device while operating the device, so that a maintenance frequency and a calibration frequency can be optimized while substantial throughput is increased.

Solution to Problem

An electrolyte concentration measurement device according to the invention is an electrolyte concentration measurement device that measures a concentration of ions in a liquid. The electrolyte concentration measurement device includes: an ion-selective electrode supplied with the liquid; a reference electrode serving as a reference for a potential; a potential measuring unit configured to acquire a potential of the ion-selective electrode; a concentration calculation unit configured to calculate a concentration of ions contained in the liquid based on the potential acquired by the potential measuring unit; a potential monitoring unit configured to monitor a potential of the ion-selective electrode and generate a potential response curve; a timing signal acquisition unit configured to acquire a timing signal related to a timing of various operations; and a potential response curve analysis unit configured to detect an abnormality sign of a device based on a relationship between the potential response curve and the timing signal.

Advantageous Effect

According to the invention, it is possible to provide an electrolyte concentration measurement device capable of accurately detecting various kinds of abnormality signs of a device while operating the device, so that a maintenance frequency and a calibration frequency can be optimized while substantial throughput is increased.

DESCRIPTION OF EMBODIMENTS

Hereinafter, embodiments will be described with reference to accompanying drawings. In the accompanying drawings, elements with the same functions may be denoted by the same number. Although the accompanying drawings show specific embodiments and implementation examples in accordance with principles of the present disclosure, they are for a purpose of understanding of the present disclosure and are not to be used for limiting interpretation of the present disclosure. Descriptions in this specification are merely exemplary, and are not intended to limit the scope of the claims or application of the present disclosure in any sense.

It is necessary to understand that the present embodiment is described in sufficient detail for those skilled in the art to perform the present disclosure, but other implementations and aspects are possible, and a configuration and a structure can be changed and various elements can be replaced without departing from the scope and the spirit of the technical idea of the present disclosure. Therefore, the following description should not be construed as being limited to the present embodiment.

First Embodiment

Figure 1:
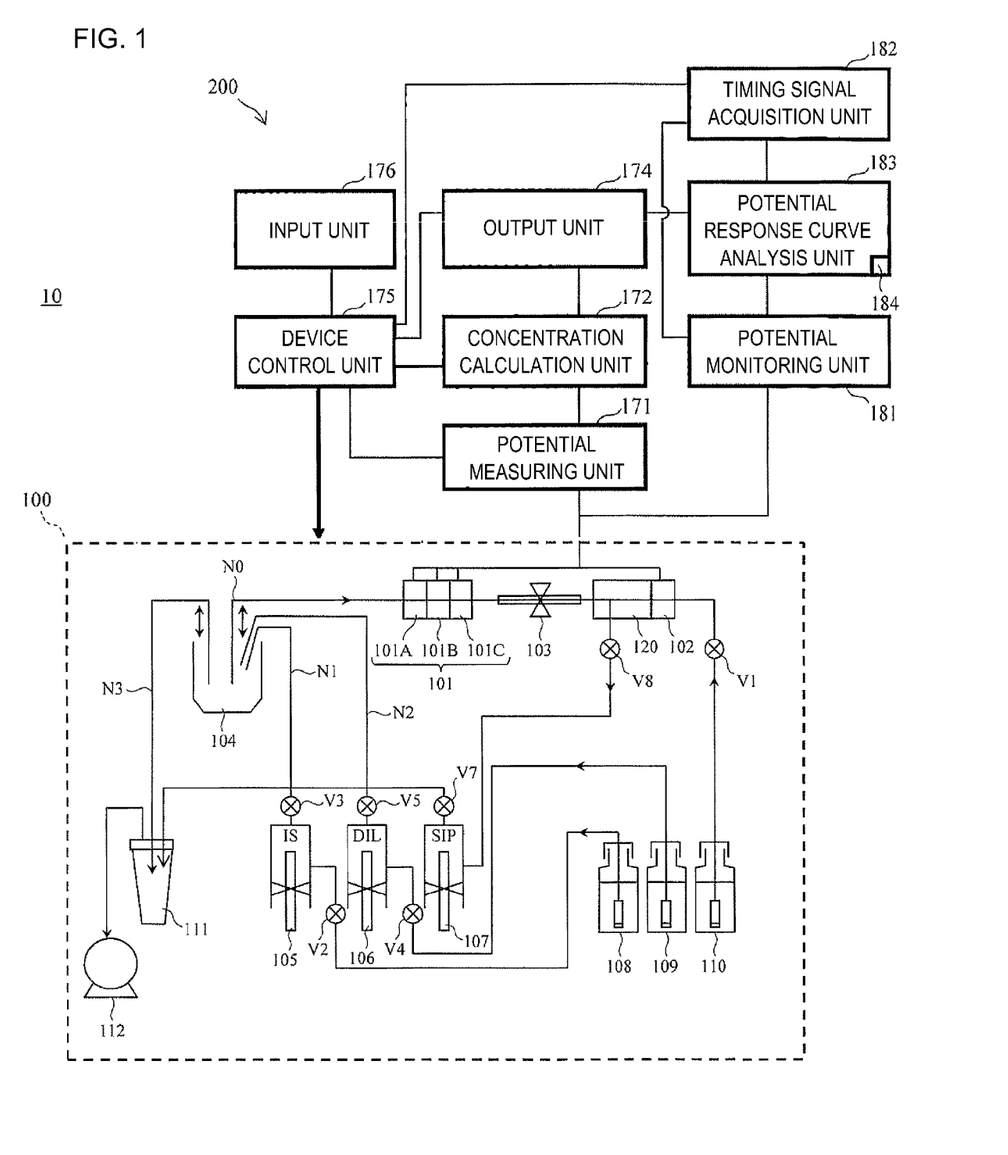
FIG. 1 is a schematic view showing an example of a flow type electrolyte concentration measurement device 10 according to a first embodiment.

An electrolyte concentration measurement device 10 according to a first embodiment will be described with reference to FIGS. 1 to 6. FIG. 1 is a schematic view showing an example of the flow type electrolyte concentration measurement device 10 according to the first embodiment. The electrolyte concentration measurement device 10 generally includes a measuring unit 100 and an arithmetic and control unit 200. The electrolyte concentration measurement device 10 is configured to measure a potential difference between electrodes by alternately performing measurement of a specimen and measurement of an internal standard solution, and to measure a concentration of a specific ion in the specimen using the potential difference and a calibration curve. As will be described later, the electrolyte concentration measurement device 10 is configured to detect an abnormality of the device including physical deterioration of an electrode or the like, a slow leak of an electromagnetic valve and the like based on a timing signal indicating a predetermined operation and a potential response curve indicating a potential change.

The measuring unit 100 includes an ion-selective electrode 101, a reference electrode 102, a pinch valve 103, a dilution tank 104, an internal standard solution syringe pump 105, a dilute solution syringe pump 106, a sipper syringe pump 107, an internal standard solution bottle 108, a dilute solution bottle 109, a reference electrode solution bottle 110, a waste liquid tank 111, and a vacuum pump 112.

The ion-selective electrode 101 includes, for example, a chlorine ion electrode 101A, a potassium ion electrode 101B, and a sodium ion electrode 101C. As will be described later, the ion-selective electrode 101 is supplied with a specimen solution mixed and diluted with a dilute solution (diluted specimen solution), or an internal standard solution from the dilution tank 104 via a sipper nozzle N0. The reference electrode 102 is supplied with a reference electrode solution as described later. The reference electrode solution is stored in the reference electrode solution bottle 110, and is dispensed to the reference electrode 102 via a flow path provided with an electromagnetic valve V1 as appropriate. In the following description, the chlorine ion electrode 101A, the potassium ion electrode 101B, and the sodium ion electrode 101C may be collectively referred to as "ion-selective electrodes 101A to 101C".

The pinch valve 103 switches between opening and closing of a flow path connecting the ion-selective electrode 101 and the reference electrode 102.

The dilution tank 104 is filled with the specimen solution diluted with the dilute solution or the internal standard solution. The internal standard solution syringe pump 105 is a pump for dispensing the internal standard solution toward the dilution tank 104. The internal standard solution is stored in the internal standard solution bottle 108 and is dispensed to the dilution tank 104 by the internal standard solution syringe pump 105. An electromagnetic valve V2 is provided in a flow path connecting the internal standard solution bottle 108 and the internal standard solution syringe pump 105, and an electromagnetic valve V3 is provided in an internal standard solution nozzle N1. When dispensing the internal standard solution, the electromagnetic valves V2 and V3 are opened. The internal standard solution nozzle N1 may be provided with a preheater (not shown) for heating the internal standard solution.

The dilute solution syringe pump 106 is a pump for dispensing the dilute solution toward the dilution tank 104. The dilute solution is stored in the dilute solution bottle 109, and is dispensed to the dilution tank 104 by the dilute solution syringe pump 106. An electromagnetic valve V4 is provided in a flow path connecting the dilute solution bottle 109 and the dilute solution syringe pump 106, and an electromagnetic valve V5 is provided in a sipper nozzle N2. The sipper nozzle N2 may be provided with a preheater (not shown) for heating the dilute solution. The internal standard solution nozzle N1 and the sipper nozzle N2 can be inserted into and removed from the dilution tank 104 as needed.

The sipper syringe pump 107 is a pump that operates when the specimen solution or the like is suctioned from the dilution tank 104 to an ion-selective electrode 101 side. When a suction operation of the specimen solution or the like is performed by the sipper syringe pump 107, the pinch valve 103 is also opened. The specimen solution suctioned by the sipper syringe pump 107 is discarded as a waste liquid toward the waste liquid tank 111.

The sipper syringe pump 107 operates when the reference electrode solution is suctioned toward the reference electrode 102 and when the reference electrode solution is suctioned from the reference electrode 102 to be discarded. In this case, an electromagnetic valve V8 provided in a flow path between the reference electrode 102 and the sipper syringe pump 107 and an electromagnetic valve V7 provided in a flow path between the sipper syringe pump 107 and the waste liquid tank 111 are opened, while the pinch valve 103 is closed. The vacuum pump 112 operates when the waste liquid is discharged further to an outside from the waste liquid tank 111.

In this way, when the specimen solution or the like is injected into the ion-selective electrode 101, and the reference electrode solution is injected into the reference electrode 102, a potential difference between the ion-selective electrode 101 and the reference electrode 102 is generated. The potential difference changes depending on a concentration of an ion to be analyzed in the liquid introduced into a flow path of the ion-selective electrode 101. Therefore, by measuring the potential difference, the concentration of an ion to be analyzed (for example, Cl, K, Na) in the solution can be calculated.

The arithmetic and control unit 200 includes a potential measuring unit 171, a concentration calculation unit 172, an output unit 174, a device control unit 175, an input unit 176, a potential monitoring unit 181, a timing signal acquisition unit 182, a potential response curve analysis unit 183, and a data storage unit 184.

The potential measuring unit 171 has a function of measuring a potential difference (electromotive force) between the ion-selective electrodes 101A to 101C and the reference electrode 102. More specifically, the potential measuring unit 171 has a function of measuring a stable potential after a lapse of a predetermined time from an introduction of the liquid into the flow paths of the ion-selective electrodes 101A to 101C. The concentration calculation unit 172 calculates a concentration of a specific ion ($Cl^-$, $K^+$, and $Na^+$) in the diluted specimen solution or the internal standard solution based on the potential difference calculated by the potential measuring unit 171. The output unit 174 includes a display or the like for outputting an arithmetic result and the like in the concentration calculation unit 172. The device control unit 175 controls the measuring unit 100. The input unit 176 is an interface for inputting various kinds of data or commands to the device control unit 175.

The potential monitoring unit 181 continuously monitors the potentials of the ion-selective electrodes 101A to 101C, and generates a potential response curve indicating a temporal change of the monitored potential. More specifically, the potential monitoring unit 181 has a function of monitoring a transient change in the potential (potential response curve) from the introduction of the liquid toward the flow paths of the ion-selective electrodes 101A to 101C until discharging of the liquid. Here, "transient" means a temporary change in the potential caused by an actual operation of various components, a flow of liquid in a pipe, or a diffusion of substances or liquid, which is different from a timing at which a stable measurement potential is acquired. The timing signal acquisition unit 182 acquires various timing signals output from the device control unit 175 toward the measuring unit 100.

The potential response curve analysis unit 183 has a function of analyzing the potential response curve generated by the potential monitoring unit 181. The potential response curve analysis unit 183 also acquires the above-described timing signal from the timing signal acquisition unit 182 and associates the timing signal with the potential response curve. More specifically, the potential response curve analysis unit 183 determines signs of a physical change of the electrode and deterioration of various mechanical units based on a waveform of the potential response curve during an operation of the various mechanical units and immediately after the operation. Further, the potential response curve analysis unit 183 determines contamination of a surface of an ion-sensitive membrane of the ion-selective electrode 101 based on a waveform of the potential response curve at the time of stopping the operation of various mechanical units related to a movement of the liquid in the flow path of the liquid.

The reference electrode solution introduced into the flow path of the reference electrode 102 and the diluted specimen solution (or internal standard solution) introduced into the ion-selective electrode 101 come into contact with each other in a liquid junction portion 120 to form a liquid junction. The liquid junction electrically connects the ion-selective electrode 101 and the reference electrode 102. At this time, the potential difference (electromotive force) between each ion-selective electrode 101 and the reference electrode 102 varies depending on a concentration of an ion to be analyzed in the diluted specimen solution (or internal standard solution) introduced into the flow path of the ion-selective electrode 101. The electromotive force can be measured by the potential measuring unit 171, and the ion concentration can be calculated by the concentration calculation unit 172. Details of a calculation method will be described later.

Figure 2A:
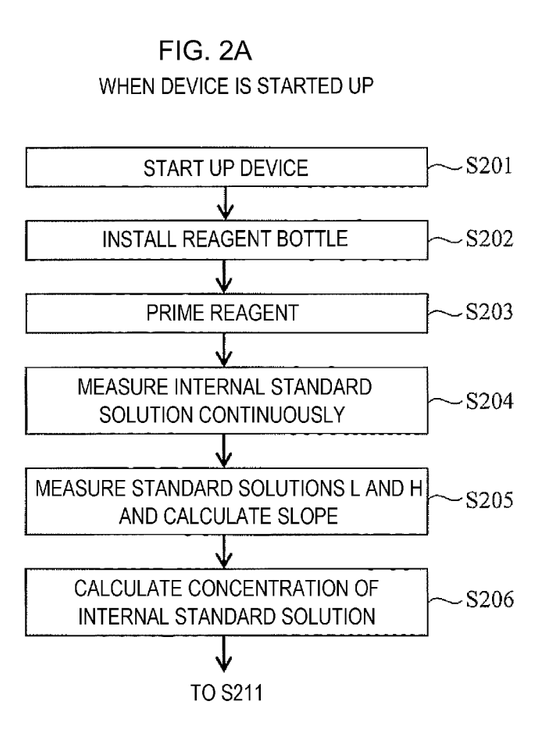
FIGS. 2A-2B are a flowchart showing a procedure of measurement of the electrolyte concentration measurement device according to the first embodiment.
Figure 2B:
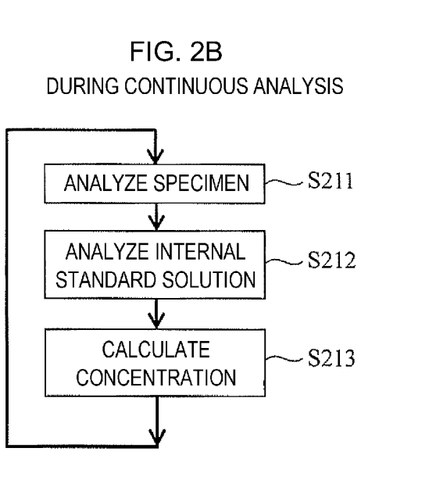

Next, a procedure of measurement in the electrolyte concentration device according to the first embodiment will be described with reference to a flowchart in FIGS. 2A-2B. In FIG. 2A, shows a procedure when the device is started up; and FIG. 2B shows a procedure when the specimen and the internal standard solution are measured alternately and continuously ("continuous analysis") after the device is started up.

First, the procedure when the device is started up will be described with reference to FIG. 2A. First, a power supply (not shown) is turned on to start up the device 10 (step S201), and the reagent bottles 108, 109, and 110 are installed (step S202). Thereafter, the device 10 is initially filled with a reagent in the reagent bottle (reagent prime) (step S203).

After completion of a temperature adjustment, the internal standard solution is continuously measured (step S204) to ensure that the potential of the electrode is stable. Subsequently, in order to obtain a calibration curve of the ion-selective electrodes 101A to 101C, two types of standard solutions having known concentrations (high concentration (H) and low concentration (L)) are measured, and slope sensitivity SL of the calibration curve is calculated (step S205). Subsequently, based on the slope sensitivity SL obtained in step S205 and the measured electromotive force, a concentration Cis of the internal standard solution is calculated (step S206).

In various operations in steps S201 to S206 described above, a timing signal for operating various pumps 105 to 107, various electromagnetic valves, and other driving units in the electrolyte concentration measurement device 10 is output from the device control unit 175. The timing signal is acquired by the timing signal acquisition unit 182. In steps S201 to S206, the potentials of the ion-selective electrodes 101A to 101C vary, and the variation is monitored by the potential monitoring unit 181. Data of the monitored potential is also transmitted to the timing signal acquisition unit 182, and is associated with the timing signal in data processing. The potential response curve analysis unit 183 generates the potential response curve in accordance with the data of the potential, and associate the timing signal with the potential response curve to analyze features of the potential response curve at each timing.

Here, specific operations of steps S205 and S206 will be described. After dispensing the standard solution (L) having the known low concentration (concentration $C_L$) into the dilution tank 104, the dilute solution in the dilute solution bottle 109 is further dispensed into the dilution tank 104 using the dilute solution syringe pump 106, and the standard solution (L) having the known low concentration is diluted at a set ratio D1.

Next, the sipper syringe pump 107 is operated, and the diluted standard solution (L) having the known low concentration in the dilution tank 104 is suctioned via the sipper nozzle N0 and introduced into the flow paths of the ion-selective electrodes 101A to 101C. Further, the reference electrode solution is introduced into the flow path of the reference electrode 102 from the reference electrode solution bottle 110.

In the liquid junction portion 120, the reference electrode solution and the diluted standard solution (L) having the known low concentration come into contact with each other. Thereafter, each potential difference between the ion-selective electrodes 101A to 101C and the reference electrode 102 (electromotive force $EMF_L$ of the standard solution (L) having the known low concentration) is measured by the potential measuring unit 171.

The standard solution (L) remaining in the dilution tank 104 is suctioned by a vacuum suction nozzle N3 and is discarded into the waste liquid tank 111 while measuring the electromotive force $EMF_L$ of the standard solution (L) having the known low concentration. Thereafter, the internal standard solution in the internal standard solution bottle 108 is newly dispensed into the dilution tank 104 using the internal standard solution syringe pump 105. Then, the internal standard solution in the dilution tank 104 is suctioned using the sipper syringe pump 107, and the flow paths of the ion-selective electrodes 101A to 101C are filled with the internal standard solution. Subsequently, the reference electrode solution is introduced from the reference electrode solution bottle 110 to the flow path of the reference electrode 102.

Thereafter, as in the case of the standard solution having the known low concentration, the electromotive force (measured electromotive force $EMF_{IS}$ of the internal standard solution) of the ion-selective electrodes 101A to 101C in a state of filled with the internal standard solution and the reference electrode solution is measured by the potential measuring unit 171. The internal standard solution remaining in the dilution tank 104 is suctioned by the vacuum suction nozzle N3 and discarded into the waste liquid tank 111 while measuring the internal standard solution. Thereafter, after the standard solution (H) having the known concentration ($C_H$) is dispensed into the dilution tank 104, the dilute solution in the dilute solution bottle 109 is dispensed into the dilution tank 104 using the dilute solution syringe pump 106, and the standard solution (H) having the known high concentration is diluted at the set ratio D1.

The diluted standard solution (H) having the known high concentration in the dilution tank 104 is suctioned from the sipper nozzle N0 and introduced into the flow paths of the ion-selective electrodes 101A to 101C. Further, the reference electrode solution is introduced into the flow path of the reference electrode 102 from the reference electrode solution bottle 110.

In the liquid junction portion 120, the reference electrode solution and the diluted standard solution (H) having the known high concentration come into contact with each other. Thereafter, each potential difference (electromotive force $EMF_H$ of the standard solution (H) having the known high concentration) between the ion-selective electrodes 101A to 101C and the reference electrode 102 is measured by the potential measuring unit 171.

The standard solution (H) remaining in the dilution tank 104 is suctioned by the vacuum suction nozzle N3 and is discarded into the waste liquid tank 111 while measuring the electromotive force $EMF_H$ of the standard solution (H) having the known high concentration. Thereafter, the internal standard solution in the internal standard solution bottle 108 is newly dispensed into the dilution tank 104 using the internal standard solution syringe pump 105. Then, the internal standard solution in the dilution tank 104 is suctioned using the sipper syringe pump 107, and the flow paths of the ion-selective electrodes 101A to 101C are filled with the internal standard solution. Subsequently, the reference electrode solution is introduced from the reference electrode solution bottle 110 to the flow path of the reference electrode 102. Thereafter, the electromotive force of the ion-selective electrodes 101A to 101C is measured by the potential measuring unit 171 in the same manner as described above.

The internal standard solution remaining in the dilution tank 104 is suctioned by the vacuum suction nozzle N3 and discarded into the waste liquid tank 111.

The slope sensitivity SL of the calibration curve is calculated by using the following equation (1) in the concentration calculation unit 172 based on the electromotive forces $EMF_H$ and $EMF_L$ measured by the potential measuring unit 171 as described above.

[Math 1]

$$SL = (EMF_H - EMF_L)/(\text{Log } C_H - \text{Log } C_L) \quad \text{Equation (1)}$$

The calibration is performed by the above operation. The slope sensitivity SL corresponds to $2.303 \times (RT/zF)$ in the following equation (2) (Nernst equation).

[Math 2]

$$E = E0 + 2.303 \times (RT/zF) \times \log(f \times C) \quad \text{Equation (2)}$$

E0: Constant potential determined by measurement system
z: Valence of ion to be measured
F: Faraday constant
R: Gas constant
T: Absolute temperature
f: Activity coefficient
C: Ion concentration The slope sensitivity SL can be obtained by calculation based on the absolute temperature T and the valence of the ion to be measured z, but in the first embodiment, the slope sensitivity SL peculiar to the electrode is obtained by performing the above calibration so as to further improve analysis accuracy.

The concentration Cis of the internal standard solution is obtained by the following equations (3) and (4) based on the measured electromotive force EMF's of the internal standard solution.

[Math 3]

$$Cis = C_L \times 10^a \quad \text{Equation (3)}$$

$$a = (EMF_{IS} - EMF_L)/SL \quad \text{Equation (4)}$$

Although the specific procedure of the calibration has been described above, the procedure of the calibration is not limited thereto. In the above example, the standard solution having the known high concentration is measured after the measurement of the standard solution having the known low concentration, but the order may be reversed.

When the start-up of the device is completed as shown in FIG. 2A, the specimen analysis is subsequently performed. In the specimen analysis, analysis of the specimen and analysis of the internal standard solution are alternately and continuously performed.

An operation of continuous analysis of the specimen and the internal standard solution will be described with reference to FIG. 2B. After the calibration, serum, urine, or the like is analyzed as the specimen. Specifically, after dispensing the specimen into the dilution tank 104 using a specimen dispensing nozzle (not shown), the dilute solution in the dilute solution bottle 109 is dispensed into the dilution tank 104 using the dilute solution syringe pump 106, and the specimen is diluted at a set ratio D2 to generate a diluted specimen solution. The diluted specimen solution in the dilution tank 104 is suctioned from the sipper nozzle N0 and introduced into the flow paths of the ion-selective electrodes 101A to 101C. In addition, the reference electrode solution is introduced from the reference electrode solution bottle 110 into the flow path of the reference electrode 102.

In the liquid junction portion 120, the reference electrode solution and the diluted specimen solution come into contact with each other. Thereafter, each potential difference (electromotive force $EMF_S$ of the specimen) between the ion-selective electrodes 101A to 101C and the reference electrode 102 is measured by the potential measuring unit 171, whereby the diluted specimen solution is analyzed (step S211).

The diluted specimen solution remaining in the dilution tank 104 is suctioned by the vacuum suction nozzle N3 and discarded into the waste liquid tank 111 while measuring the electromotive force of the diluted specimen solution. Thereafter, the internal standard solution is newly dispensed into the dilution tank 104 from the internal standard solution bottle 108 using the internal standard solution syringe pump 105. Then, the internal standard solution in the dilution tank 104 is suctioned using the sipper syringe pump 107, and the flow paths of the ion-selective electrodes 101A to 101C are filled with the internal standard solution. Subsequently, the reference electrode solution is introduced from the reference electrode solution bottle 110 to the flow path of the reference electrode 102. Thereafter, the electromotive force of each electrode is measured by the potential measuring unit 171 to analyze the internal standard solution (step S212).

When the analysis of the diluted specimen solution and the internal standard solution is completed in this manner, the specimen concentration is calculated according to the result.

The concentration Cs of the specimen is calculated using the following calculation equations based on the slope sensitivity SL and the concentration Cis of the internal standard solution (step S213).

[Math 4]

$$Cs = Cis \times 10^b \quad \text{Equation (5)}$$

$$b = (EMF_{IS} - EMF_S)/SL \quad \text{Equation (6)}$$

The above calculation equations are basic. In the device according to the present embodiment, the measurement of the internal standard solution having a constant concentration is also executed before and after the measurement of the diluted specimen solution. Then, a measurement value of the diluted specimen solution is corrected based on a measurement value of the internal standard solution. Therefore, accurate measurement can be implemented even when a gentle potential variation (potential drift phenomenon) occurs due to a change in a surface of a sensitive membrane of the ion-selective electrodes 101A to 101C or a temperature change.

In various operations in steps S211 to S213 described above, a timing signal for operating various pumps 105 to 107, various electromagnetic valves V1 to V8, and other driving units in the electrolyte concentration measurement device 10 is output from the device control unit 175. The timing signal is acquired by the timing signal acquisition unit 182. In steps S201 to S206, the potentials of the ion-selective electrodes 101A to 101C vary, and the variation is monitored continuously by the potential monitoring unit 181. Data of the potential response curve, which is data of the monitored potential, is also transmitted to the timing signal acquisition unit 182, and is associated with the timing signal in data processing. The potential response curve analysis unit 183 associates the potential response curve with the timing signal to acquire and analyze a feature value of the potential response curve at each timing.

Figure 3:
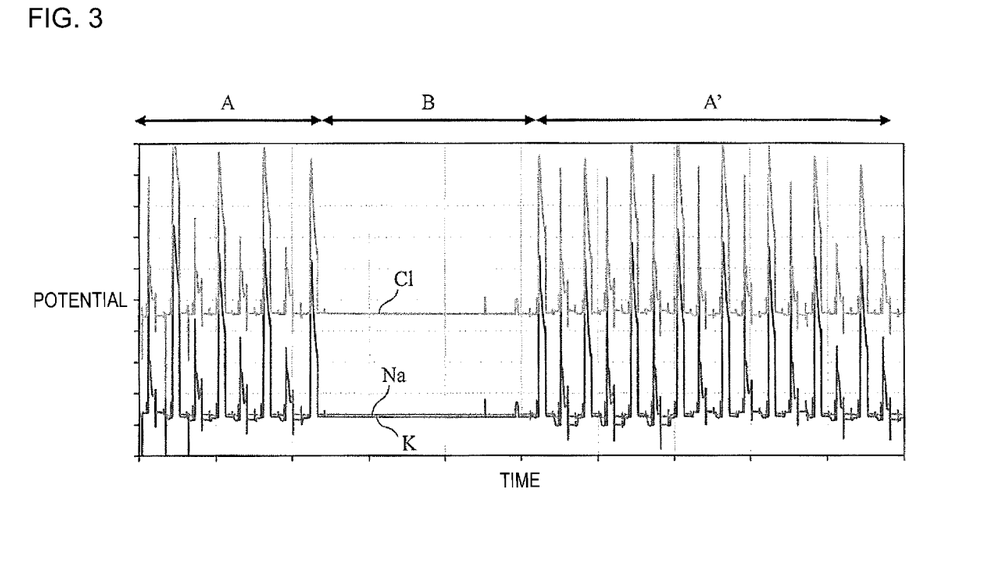
FIG. 3 is an example of a graph of a potential response curve acquired by a potential monitoring unit 181.

FIG. 3 is an example of a graph of the potential response curve acquired by the potential monitoring unit 181. In this graph, a horizontal axis represents a time and a vertical axis represents a potential, and a potential of the chlorine ion electrode 101A, a potential of the sodium ion electrode 101C, and a potential of the potassium ion electrode 101B are shown in descending order of the potential.

In the graph in FIG. 3, sections A and A' are measurement sections during which the diluted specimen solution or the internal standard solution is measured, and a section B is a temporary pause section, and is a section including a return operation to the measurement section. That is, the sections A and A' are measurement sections that are continuously executed with the temporary pause section B interposed therebetween. Although only two measurement sections A and A' are shown in FIG. 3, such measurement sections A and A' can be executed a plurality of times.

When the measurement sections A and A' are continuously executed with the temporary pause section B interposed therebetween, the internal standard solution and the diluted specimen solution are alternately subjected to analysis. The detailed operation will be described later. When the internal standard solution or the diluted specimen solution is introduced into the ion-selective electrodes 101A to 101C, the flow path is temporarily blocked by the pinch valve 103. In this case, the ion selective electrodes 101A to 101C may exhibit a high potential. In addition, although an air gap is introduced to segment the diluted specimen solution and the internal standard solution, the potentials of the ion-selective electrodes 101A to 101C may vary greatly in this case as well.

Figure 4:
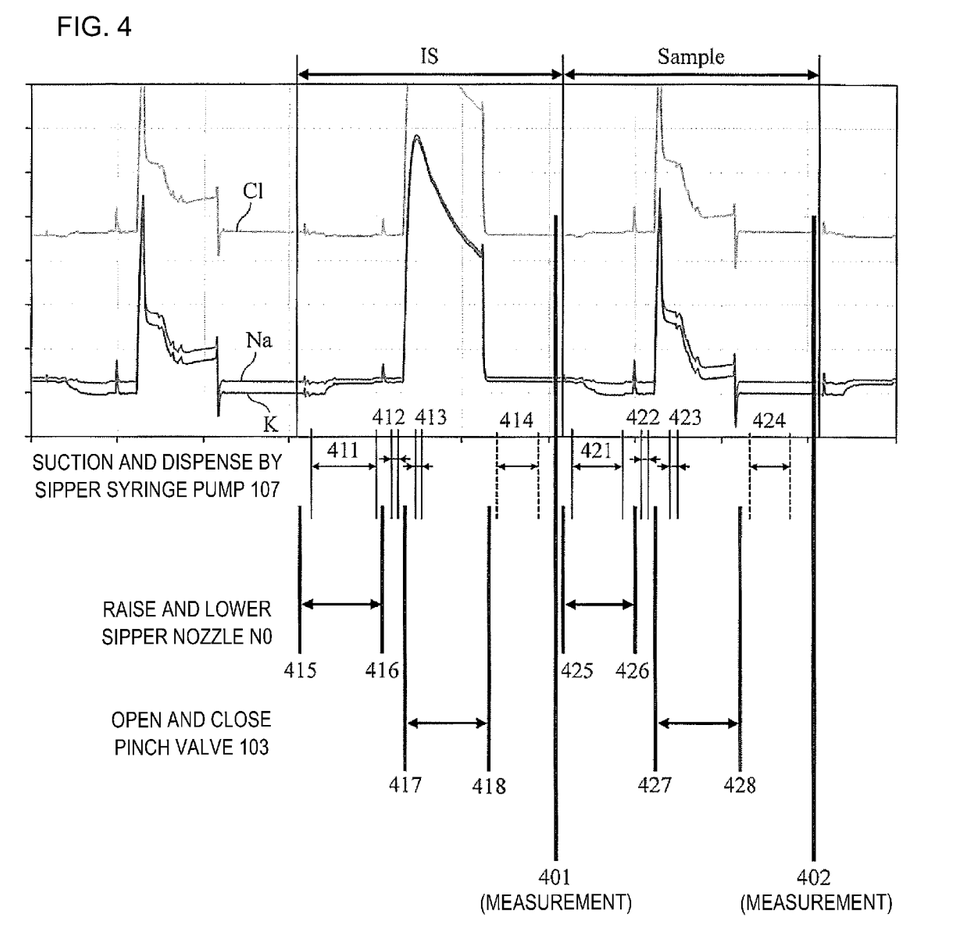
FIG. 4 is a conceptual diagram showing an enlarged view of a part of the potential response curve in a measurement section A acquired by the potential monitoring unit 181 according to the first embodiment and a timing signal acquired by a timing signal acquisition unit 182 superimposed.

FIG. 4 shows an enlarged view of a part of the potential response curve in the measurement section A acquired by the potential monitoring unit 181 and the timing signal acquired by the timing signal acquisition unit 182 superimposed.

During continuous analysis, the internal standard solution and the diluted specimen solution are alternately introduced into the ion-selective electrodes 101A to 101C. In the potential measuring unit 171, the potentials of the internal standard solution and the diluted specimen solution are separately measured at timings 401 and 402 at which the potential is relatively stable. The potential is measured a plurality of times, instead of data at only one time point, at short time intervals in the timings 401 and 402, respectively, and an average value of the plurality of potentials and the like can be taken.

When the potential is obtained in the potential measuring unit 171, the concentration of the specimen is calculated by the concentration calculation unit 172 using the data of the potential. As an example, the potential monitoring unit 181 can acquire the potential at intervals of 10 ms (sampling rate). Although an acquisition interval in the potential monitoring unit 181 can be changed, acquisition at intervals shorter than 100 ms is suitable for monitoring a transient potential, such as a pressure variation.

In addition, when the sampling rate is too high, it is preferable to acquire data of the potential at intervals of 0.01 ms or more because a data size becomes enormous. The sampling rate in the potential monitoring unit 181 is not necessarily constant all the time, and may be changed as appropriate. For example, the sampling rate in the potential monitoring unit 181 may be set to a specific value only at the timing at which the device component, the electrode, or the like of interest operates, and may be set to a value different from those in other cases. Further, the sampling rate may be changed according to a type of device component or electrode of interest, or operating conditions.

Further, a deterioration mode may be set, in which a timing at which a state change can be monitored is set in advance, and only potentials before and after the corresponding timing obtained by the timing signal acquisition unit 182 are acquired by the potential monitoring unit 181.

Here, with reference to FIG. 4, an example of various operations occurring in the measurement section A will be described with reference to reference numerals in FIG. 4. When the internal standard solution is measured, the sipper nozzle N0 is lowered into the dilution tank 104 filled with the internal standard solution (415), and a tip end of the sipper nozzle N0 enters the internal standard solution in the dilution tank 104. Thereafter, the sipper syringe pump 107 is activated, and the internal standard solution is suctioned from the dilution tank 104 via the sipper nozzle N0 (411) and introduced into the measurement flow paths of the ion-selective electrodes 101A to 101C.

Next, the sipper nozzle N0 is raised to separate the tip end thereof from a liquid surface of the internal standard solution (416), and then, the air gap is introduced into the measurement flow path by suction by the sipper syringe pump 107 (412). Thereafter, the pinch valve is closed (417), the sipper syringe pump 107 is activated again, the reference electrode solution is suctioned from the reference electrode solution bottle 110 (413), and the reference electrode solution is introduced into the flow path of the reference electrode 102.

Then, the pinch valve is opened again (418), and the potentials of the ion-selective electrodes 101A to 101C are measured by the potential measuring unit 171 after a certain period of time (401). Meanwhile, the electromagnetic valve V8 or the like connected to the measurement flow path is closed, and the liquid in the sipper syringe pump 107 is discharged (414).

During the specimen measurement in FIG. 4, almost the same operation as that in the internal standard solution measurement is performed. In the dilution tank 104, the specimen is diluted with the dilute solution supplied from the dilute solution tank 109. Thereafter, the sipper nozzle N0 is lowered into the dilution tank 104 filled with the diluted specimen solution (425), and the tip end of the sipper nozzle N0 enters the diluted specimen solution in the dilution tank 104. Then, the sipper syringe pump 107 is activated to suction the diluted specimen solution from the dilution tank 104 via the sipper nozzle N0 (421), and the diluted specimen solution is introduced into the measurement flow paths of the ion-selective electrodes 101A to 101C.

Next, the sipper nozzle N0 is raised to separate the tip end thereof from the liquid surface of the diluted specimen solution (426), and then the air gap is introduced into the measurement flow path by suction by the sipper syringe pump 107 (422). Thereafter, the pinch valve is closed (427), the sipper syringe pump 107 is activated again to suction the reference electrode solution from the reference electrode solution bottle 110 (423), and the reference electrode solution is introduced into the flow path of the reference electrode 102.

Thereafter, the pinch valve is opened again (428), and the potentials of the ion-selective electrodes 101A to 101C are measured by the potential measuring unit 171 after a certain period of time (402). Meanwhile, the electromagnetic valve V8 or the like connected to the measurement flow path is closed, and the liquid in the sipper syringe pump 107 is discharged (424).

Timing signals (411 to 428) for instructing start and end of driving or the like of various members as described above are acquired from the device control unit 175 in the timing signal acquisition unit 182. The acquired timing signals are sent to the potential response curve analysis unit 183. These series of operations are performed substantially at the same time. In addition to the timing signals specifically shown in FIG. 4, a timing signal for instructing opening and closing of the electromagnetic valves V1 to V8, a timing signal for instructing a dispensing operation into the dilution tank 104, a timing signal for instructing a vacuum suction operation, and the like are also output from the device control unit 175 and acquired by the timing signal acquisition unit 182. The potential monitoring unit 181 may be configured to monitor the potential not only during continuous analysis of the measurement sections A and A' in FIG. 3, but also during the temporary pause section B, the start-up of the device, and the calibration.

By associating and recording the timing signals 411 to 428 and the potential response curve obtained by the potential monitoring unit 181 in a time-series manner as shown in FIG. 4, various pieces of information can be read. For example, when the sipper nozzle N0 is lowered or raised, a potential change estimated to be caused by contact of liquids in the dilution tank 104 or vibration of the liquid in the flow path appears in the potential response curve. Further, vibration is transmitted to various electrodes and other components by a suction and dispensing operation of the sipper syringe pump 107, whereby a potential in the potential response curve changes.

As described above, in the device according to the first embodiment, since suction and dispensing of the liquid, a switching operation of the flow path, and the like are frequently performed at short time intervals, in addition to information on an ion concentration in the liquid and a temperature, information on pressure variation, vibration, electrical noise and the like can also be obtained based on the transient potential acquired by the potential monitoring unit 181.

When the diluted specimen solution or the internal standard solution is suctioned using the sipper syringe pump 107, a transient response curve considered to be derived from a change in the ion concentration of the liquid is observed. Further, when a tube serving as the flow path of the ion solution (diluted specimen solution or internal standard solution) is closed by the pinch valve 103, the ion solution is divided in the flow path, and an abrupt increase in the potential is observed.

As described above, in each timing signal, a state (degree of deterioration, failure, and the like) of the component or electrode to be operated at that time becomes clear from an analysis result of the potential response curve. For example, a degree of deterioration of the tube in the pinch valve 103 and a presence or absence of a failure of the pinch valve 103 itself can be determined based on the potential change appearing in the potential response curve when the timing signal for instructing closing of the pinch valve 103 is output.

At the timing when the ion solution is suctioned and dispensed by the sipper syringe pump 107, a movement of the ion solution, a movement of a bubble, a pressure variation, electrical noise, and the like appear as the potential change. In addition, a change in a degree of leakage of the electromagnetic valve, deterioration of a seal portion of the syringe pumps 105 to 107, a change in physical properties of the sensitive membranes of the ion-selective electrodes 101A to 101C, and the like can also be detected in association with the timing signal. Information on such deterioration and variation is unlikely to appear in the measurement potentials of the ion-selective electrodes 101A to 101C, and is difficult to detect even when another sensor is added. However, according to the first embodiment, since the timing signal and the potential response curve are associated with each other and analyzed by the potential response curve analysis unit 183, the degree of deterioration can be easily determined according to the potential response curve.

A contamination state of the surface of the sensitive membranes of the ion-selective electrodes 101A to 101C can be determined based on the potential response curves before and after suctioning the internal standard solution, an ion solution having the known concentration different from that of the internal standard solution, and an ion solution containing interfering ions into the flow paths of the ion-selective electrodes 101A to 101C together with a predetermined timing signal. When a measurement result is obtained in which contamination of the surface of the sensitive membranes of the ion selective electrodes 101A to 101C is suspected, the measurement flow path can be refreshed by cleaning the electrode flow path including the surface of the sensitive membrane with a cleaning liquid at the time of maintenance.

When a change specific to a potential of any one of the ion-selective electrodes 101A to 101C is detected, it can be determined that there is a high possibility that a sign of deterioration or failure is occurred in the one of the ion-selective electrodes 101A to 101C. On the other hand, when a similar specific change appears in all the potentials of the ion-selective electrodes 101A to 101C, it can be determined that there is a high possibility that a sign of the abnormality is occurred, not in the ion-selective electrodes 101A to 101C, but in other components in the device or the reference electrode 102.

The data storage unit 184 is provided in the potential response curve analysis unit 183 to store library data related to the feature value of the potential response curve. The library data is a set of data on various feature values related to the standard potential response curve that would be obtained when the device is in a normal state. The potential response curve analysis unit 183 compares the feature value of the library data with the feature value of the potential response curve obtained as a result of the measurement at a timing when each timing signal is output. This makes it possible to determine a state of deterioration of various electrodes and device components, surface contamination of the sensitive membranes of the ion-selective electrodes 101A to 101C, and the like.

The library data may be standard data obtained as a result of simulation, or the potential response curve obtained immediately after a user first installs and operates the device 10 may be used as the library data. The library data can also be appropriately updated based on the result of the measurement performed thereafter. Depending on an installation location of the device 10, vibration, electrical noise, and the like due to the environment may be different. Therefore, accuracy of the abnormality sign can be expected to be improved by actually operating the device 10 to obtain the library data. Further, it is possible to upload and download a library via network or the like.

As described above, in the electrolyte concentration measurement device 10 according to the first embodiment, the timing signal indicating the timing of various operations and the potential response curve obtained by measuring the potential of the ion-selective electrode are acquired in association with each other, and by analyzing the timing signal and the potential response curve, a sign of an abnormality can be detected and predicted. Therefore, maintenance can be planned before the abnormality appears in the measured potential, and the maintenance can be performed according to the plan. As an example, in the potential response curve analysis unit 183, a physical change of the ion-selective electrode 101 and a sign of the deterioration of the various mechanical units can be determined based on the waveform of the potential response curve during and immediately after an operation of the various mechanical units due to the timing signal. In addition, in the potential response curve analysis unit 183, contamination of the surface of the ion-sensitive membrane of the ion-selective electrode 101 can be determined based on the waveform of the potential response curve at the time of stopping an operation of the various mechanical units related to the movement of the liquid in the flow path of the liquid due to the timing signal.

As a method of analyzing the potential response curve, a general method used in analysis of time-series data can be used, and machine learning, deep drawing, or the like can also be used. A behavior of other components in the device affected by the operation of various components and electrodes according to the timing signal can also be predicted or simulated based on a device configuration, a physical equation, or the like, and the result can be used for analysis of the potential response curve.

Figure 5:
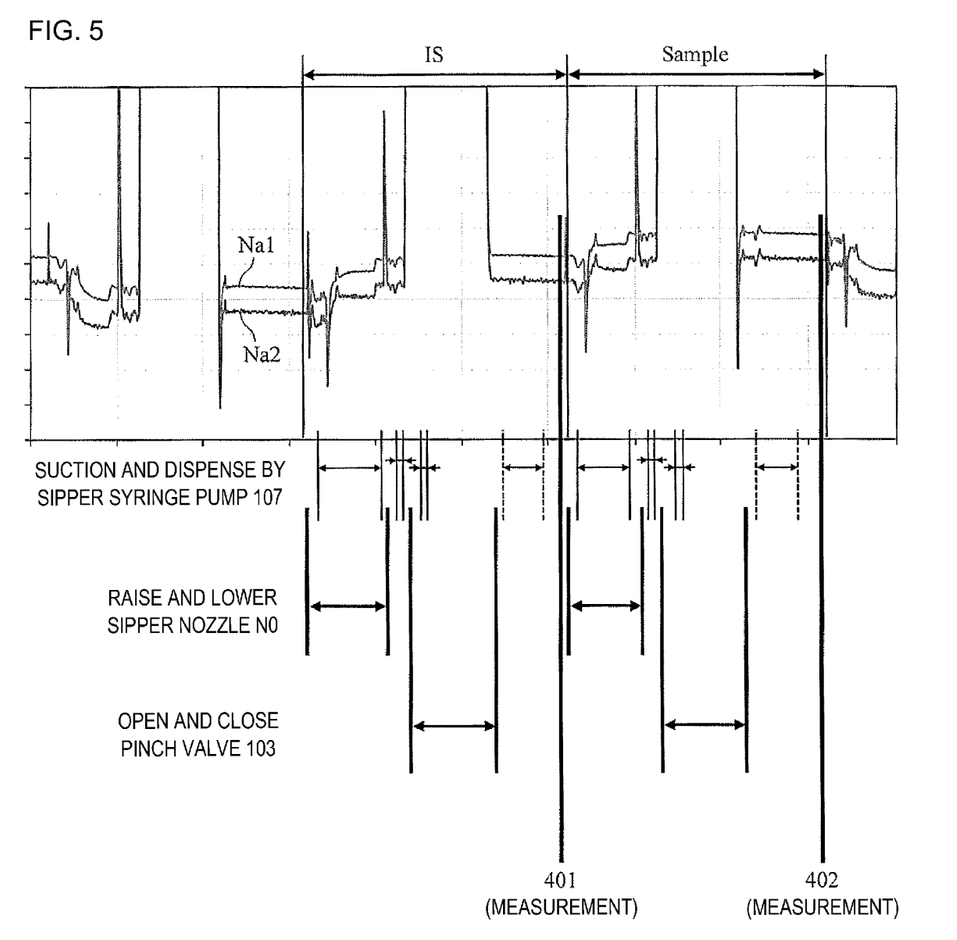
FIG. 5 is a conceptual diagram specifically showing a method of monitoring a potential related to a potential of a sodium ion electrode 101C and determining an abnormality sign.

With reference to FIG. 5, a method of monitoring a potential with respect to a potential of the sodium ion electrode 101C and determining an abnormality sign will be specifically described. FIG. 5 shows a potential response curve (NA1) obtained by measuring a predetermined specimen solution by a sodium ion electrode 101Ce whose shelf life has passed, and a potential response curve (NA2) obtained by measuring the same specimen solution by a relatively new sodium ion electrode 101Cn whose shelf life has not passed. In FIG. 5, a timing signal for instructing a timing of a suction and dispensing operation of the sipper syringe pump 107, a timing of raising and lowering the sipper nozzle N0, and a timing of opening and closing operation of the pinch valve 103 is shown together.

In the graph in FIG. 5, the slope sensitivity of the old sodium ion electrode 101Ce is 59.2 mV/digit, the slope sensitivity of the new sodium ion electrode 101Cn is 60.0 mV/digit, and both are within an allowable range. The measurement accuracy within the allowable range is obtained by both a potential response curve NA1 obtained by the old sodium ion electrode 101Ce and a potential response curve NA2 obtained by the new sodium ion electrode 101Cn.

However, as shown in FIG. 5, immediately after the sipper syringe pump 107 starts suctioning the specimen solution after the sipper nozzle N0 is lowered, a change in potential of the potential response curve NA1 is steeper than that of the potential response curve NA2. Thereafter, the potential gradually recovered. At this time, although not shown in FIG. 5, a steep change is not observed in the potential response curves of the chloride ion electrode 101A and the potassium ion electrode 101B.

When the information described above is obtained, it can be determined that the deterioration of the sodium ion electrode 101Ce progresses. A result of the determination is output to the output unit 174. The output unit 174 issues an alarm to an operator so as to replace the sodium ion electrode 101Ce at next device maintenance. As described above, an abnormality sign can be determined by analyzing a shape of the potential response curve while the measurement accuracy is within the allowable range. By detecting the sign of the abnormality in this manner, the operator can accurately make the maintenance plan and perform maintenance according to the plan.

Figure 6:
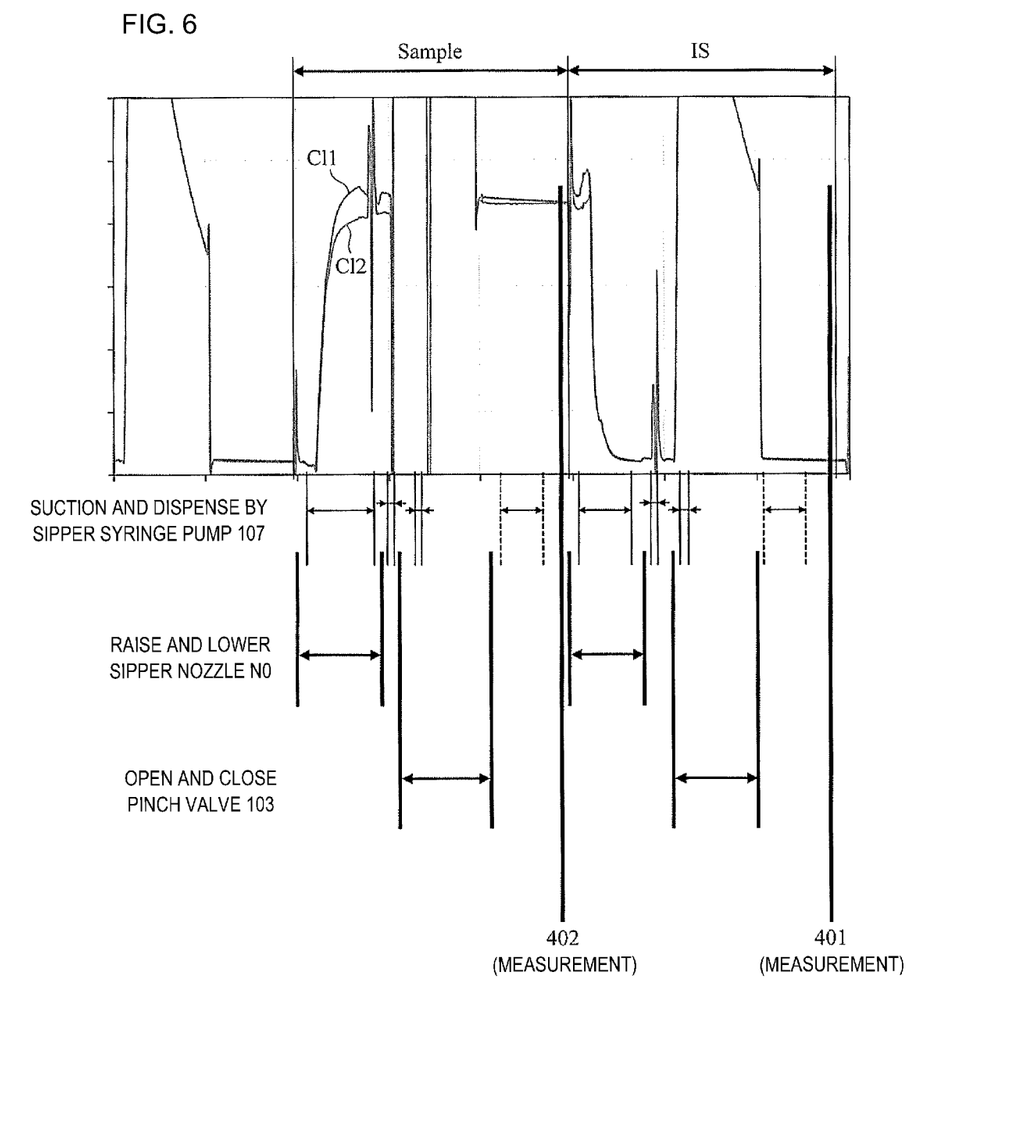
FIG. 6 is a conceptual diagram specifically showing a method of monitoring a potential related to a potential of a chlorine ion electrode 101A and determining an abnormality sign.

With reference to FIG. 6, a method of monitoring the potential with respect to the potential of the chlorine ion electrode 101A and determining an abnormality sign will be specifically described. FIG. 6 shows a potential response curve (C11) obtained by measuring a predetermined specimen solution by a chlorine ion electrode 101Ae having a first state as a surface state of the ion-sensitive membrane, and a potential response curve (C12) obtained by measuring the same specimen solution by a chlorine ion electrode 101An having a second state different from the first state. In FIG. 6, a timing signal for instructing a timing of the suction and dispensing operation of the sipper syringe pump 107, a timing of raising and lowering the sipper nozzle N0, and a timing of the opening and closing operation of the pinch valve 103 is shown together. FIG. 6 is a graph when an aqueous solution containing interfering ions is measured as a measurement object (sample).

As shown in FIG. 6, immediately after the sipper syringe pump 107 starts suctioning the sample after the sipper nozzle N0 is lowered, the potentials of both the chlorine ion electrode 101Ae and the chlorine ion electrode 101An rose sharply. This is because the liquid in the flow path of the electrodes 101Ae and 101An is replaced to the sample from the internal standard solution and a liquid composition is changed. In a latter half of a sample suction operation, a curve C11 has an upwardly convex peak, while a curve C12 gradually rises, and no upwardly convex peak appears. On the other hand, the measured potential at the timing 402 at which the concentration of the sample is calculated is almost the same on the curves C11 and C12. As described above, the sign of the abnormality can be determined by calculating shape features (presence or absence of a convex peak, amplitude thereof, width thereof) of the waveform in the potential response curve at the timing at which the timing signal is output as the feature value, and comparing the shape features with a reference value.

The reason why differences in the waveforms of the potential response curves C11 and C12 are generated during and after the sample suction is considered to be based on a difference in the surface state of the ion-sensitive membranes of the chlorine ion electrodes 101Ae and 101An or on a difference in an ion balance in the ion-sensitive membrane.

As described above, it can be seen that a situation that is difficult to be detected by simply measuring the measured potential can be detected by associating a timing signal with a potential response curve.

Second Embodiment

Figure 7:
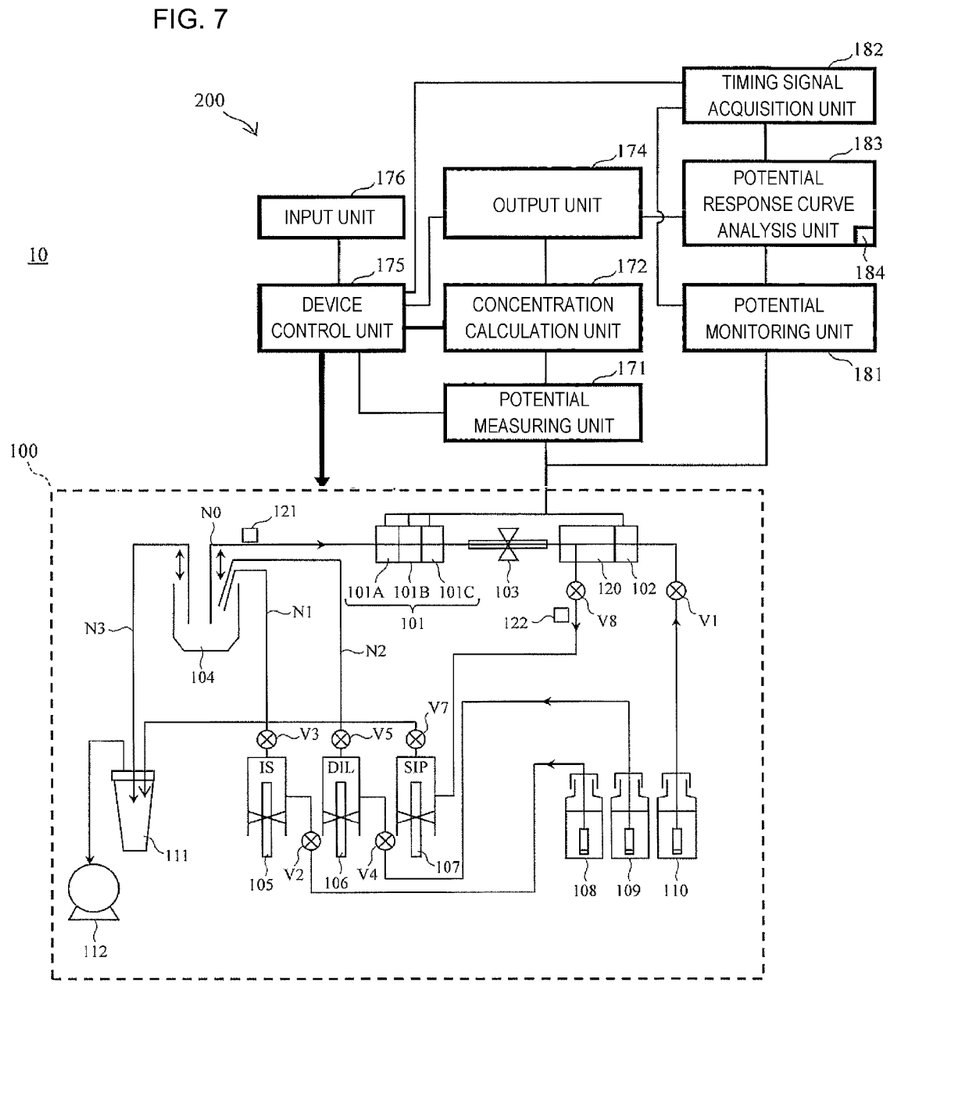
FIG. 7 is a schematic view showing an example of a flow type electrolyte concentration measurement device 10 according to a second embodiment.
Figure 8:
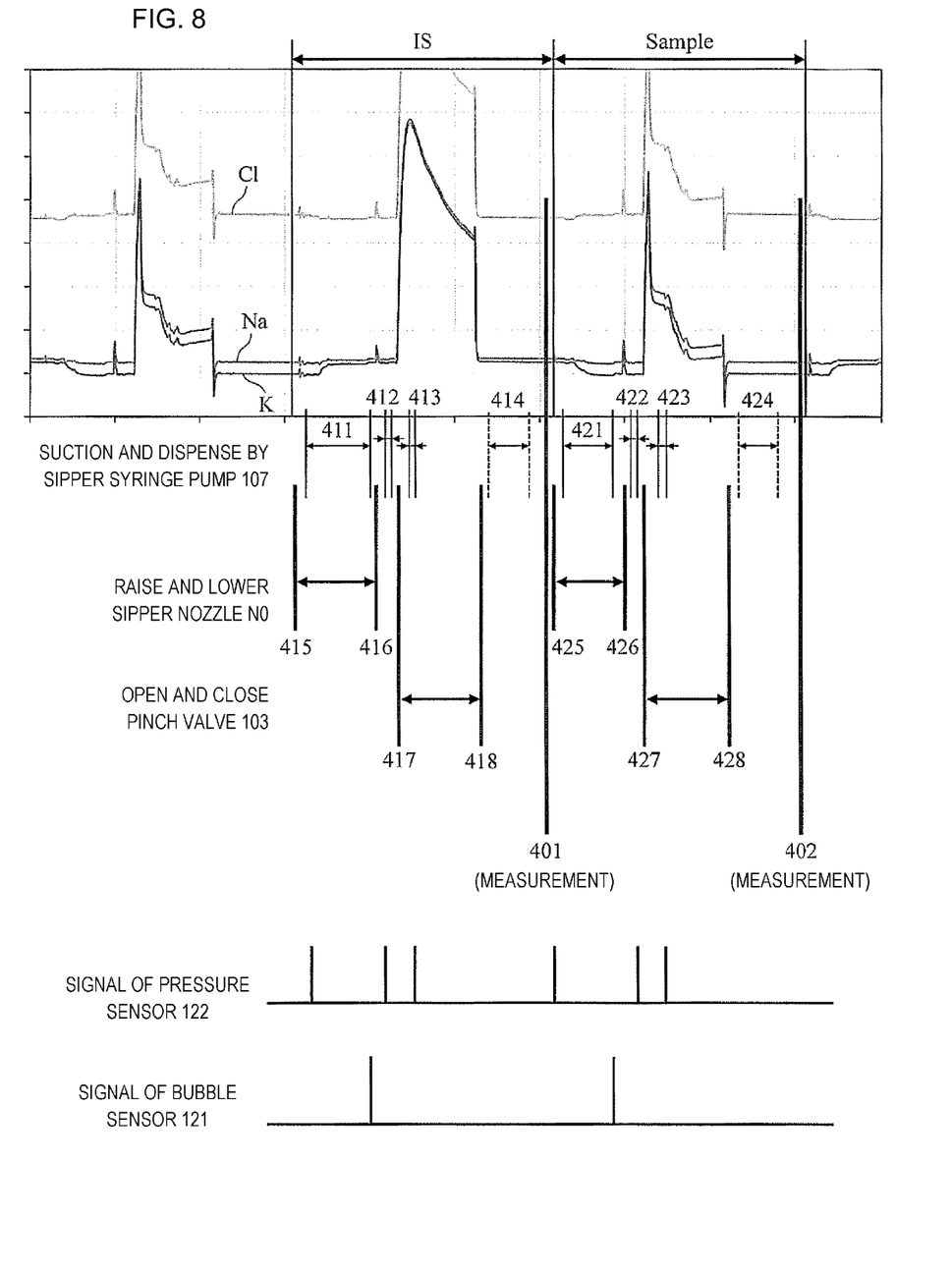
FIG. 8 is a conceptual diagram showing an enlarged view of a part of a potential response curve in a measurement section A acquired by the potential monitoring unit 181 according to the second embodiment and a timing signal acquired by the timing signal acquisition unit 182 superimposed.

Next, the electrolyte concentration measurement device 10 according to a second embodiment will be described with reference to FIGS. 7 and 8. FIG. 7 is a schematic view showing an example of the flow type electrolyte concentration measurement device 10 according to the second embodiment. The same components as those in the first embodiment (FIG. 1) are denoted by the same reference numerals, and a repetitive description thereof will be omitted below.

The electrolyte concentration measurement device 10 according to the second embodiment includes various sensors that detect a behavior in the device 10, acquires detection signals of these sensors in the timing signal acquisition unit 182, analyzes a potential response curve based on a relationship among a timing signal, a detection signal of the sensor, and the potential response curve in the potential response curve analysis unit 183, and determines an abnormality sign of the device based on the result. Here, as an example of the sensor, a bubble sensor 121 that detects a bubble in a pipe, and a pressure sensor 122 disposed in a flow path connecting the sipper syringe pump 107 and the liquid junction portion 120 to detect a pressure of the flow path are shown. A type of the sensor is not limited thereto, and for example, a liquid level sensor that detects a change in a liquid level to the dilution tank 104 or the like, a vibration sensor that detects vibration of an electrode and other various components, and the like can be provided in the device 10. The bubble sensor 121 generates a pulse signal when a bubble of a predetermined size or more passes through a predetermined position. The pressure sensor 122 generates a pulse signal when a pressure at a measurement point reaches a predetermined value. However, the invention is not limited thereto, and the pressure value may be continuously output.

An operation of the second embodiment will be described with reference to FIG. 8. FIG. 8 shows an enlarged view of a part of a potential response curve in the measurement section A acquired by the potential monitoring unit 181, a timing signal acquired by the timing signal acquisition unit 182, and a sensor detection signal superimposed. In the first embodiment, the timing signal output by the device control unit 175 is acquired by the timing signal acquisition unit 182 and associated with the potential response curve, and in the second embodiment, sensor detection signals obtained in the sensors 121 and 122 are also associated with the potential response curve in addition to the timing signal. A timing at which a predetermined sensor detection signal is output is associated with a timing at which a timing signal is output from the device control unit 175. Therefore, by acquiring the sensor detection signal by the timing signal acquisition unit 182, an operation of the device 10 and the potential response curve can be accurately associated with each other, and a sign of an abnormality can be determined more accurately.

The invention is not limited to the above embodiments, and includes various modifications. For example, the embodiment described above has been described in detail for easy understanding of the invention, and the invention is not necessarily limited to those including all the configurations described above. In addition, a part of the configuration of one embodiment can be replaced with the configuration of another embodiment, and the configuration of another embodiment can be added to the configuration of one embodiment. A part of the configuration of each embodiment can be added, deleted, or replaced with another configuration.

REFERENCE SIGN LIST

101 ion-selective electrode
101 chlorine ion electrode
101B potassium ion electrode
101C sodium ion electrode
102 reference electrode
103 pinch valve
104 dilution tank
105 internal standard solution syringe pump
106 dilute solution syringe pump
107 sipper syringe pump
108 internal standard solution bottle
109 dilute solution bottle
110 reference electrode solution bottle
111 waste liquid tank
112 vacuum pump
120 liquid junction portion
121 bubble sensor
122 pressure sensor
V1 to V8 electromagnetic valve
171 potential measuring unit
172 concentration calculation unit
174 output unit
175 device control unit
176 input unit
181 potential monitoring unit
182 timing signal acquisition unit
183 potential response curve analysis unit
184 data storage unit

The invention claimed is:

1. An electrolyte concentration measuring device that measures a concentration of ions in a liquid, the electrolyte concentration measuring device comprising:
    an ion-selective electrode supplied with the liquid;
    a reference electrode serving as a reference for a potential;
    one or more processors and one or more non-transitory computer-readable storage media, the non-transitory computer-readable storage media having stored thereon at least:
    a potential measuring unit configured to acquire a potential of the ion-selective electrode;
    a concentration calculation unit configured to calculate a concentration of ions contained in the liquid based on the potential acquired by the potential measuring unit;
    a potential monitoring unit configured to monitor a potential of the ion-selective electrode and generate a potential response curve;
    a timing signal acquisition unit configured to acquire a timing signal related to a timing of various operations; and
    a potential response curve analysis unit configured to detect an abnormality sign of a device based on a relationship between the potential response curve and the timing signal, wherein
    the potential response curve analysis unit determines, based on a waveform of a potential response curve at a time of stopping an operation of a mechanical unit related to a movement of the liquid in a flow path of the liquid, contamination of a surface of an ion-sensitive membrane of the ion-selective electrode.

2. The electrolyte concentration measuring device of claim 1, wherein the mechanical unit is a pump or a valve.

3. An electrolyte concentration measuring device that measures a concentration of ions in a liquid, the electrolyte concentration measuring device comprising:
    an ion-selective electrode supplied with the liquid;
    a reference electrode serving as a reference for a potential;
    one or more processors and one or more non-transitory computer-readable storage media, the non-transitory computer-readable storage media having stored thereon at least:
    a potential measuring unit configured to acquire a potential of the ion-selective electrode;
    a concentration calculation unit configured to calculate a concentration of ions contained in the liquid based on the potential acquired by the potential measuring unit;
    a potential monitoring unit configured to monitor a potential of the ion-selective electrode and generate a potential response curve;
    a timing signal acquisition unit configured to acquire a timing signal related to a timing of various operations;

a potential response curve analysis unit configured to detect an abnormality sign of a device based on a relationship between the potential response curve and the timing signal; and a sensor configured to detect a behavior in the electrolyte concentration measuring device, wherein the potential response curve analysis unit detects an abnormality sign based on a relationship among the potential response curve, the timing signal, and a detection signal of the sensor.

4. The electrolyte concentration measuring device according to claim 3, wherein the potential response curve analysis unit calculates a feature value of the potential response curve at a timing at which the timing signal is obtained, and detects an abnormality sign of a device according to the feature value.

5. The electrolyte concentration measuring device according to claim 4, wherein the potential response curve analysis unit has library data related to a feature value of the potential response curve, and detects an abnormality sign of a device by comparing the feature value of the library data with a feature value of a potential response curve.

6. A method of operating a device for measuring a concentration of ions in a liquid, the method comprising:

supplying an ion-selective electrode supplied with the liquid;

supplying a reference electrode serving as a reference for a potential;

acquiring a potential of the ion-selective electrode;

calculating a concentration of ions contained in the liquid based on the potential;

monitoring a potential of the ion-selective electrode and generating a potential response curve;

acquiring a timing signal related to a timing of various operations;

detecting an abnormality sign of a device based on a relationship between the potential response curve and the timing signal;

supplying a sensor configured to detect a behavior in the device, and detecting an abnormality sign based on a relationship among the potential response curve, the timing signal, and a detection signal of the sensor.

7. The method of claim 6, further comprising:

calculating a feature value of the potential response curve at a timing at which the timing signal is obtained, and detecting an abnormality sign of a device according to the feature value.

8. The method of claim 7 further comprising:

detecting an abnormality sign of a device by comparing a stored feature value of stored library data that is based on a standard potential response curve with a feature value of the potential response curve.

* * * * *